US012772343B2

(12) United States Patent
Liang et al.

(10) Patent No.: US 12,772,343 B2
(45) Date of Patent: Oct. 20, 2026

(54) GRAPHENE HEATING CHIP AND METHOD FOR MAKING THE SAME

(71) Applicants: Tsinghua University, Beijing (CN); HON HAI PRECISION INDUSTRY CO., LTD., New Taipei (TW)

(72) Inventors: Liang Liang, Beijing (CN); Jie Zhao, Beijing (CN); Yang Wei, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 811 days.

(21) Appl. No.: 18/129,012

(22) Filed: Mar. 30, 2023

(65) Prior Publication Data

US 2024/0114597 A1 Apr. 4, 2024

(30) Foreign Application Priority Data

Sep. 30, 2022 (CN) ......................... 202211208699.1

(51) Int. Cl.
*H05B 3/14* (2006.01)
*H05B 3/03* (2006.01)

(52) U.S. Cl.
CPC ............... *H05B 3/145* (2013.01); *H05B 3/03* (2013.01); *H05B 2203/017* (2013.01)

(58) Field of Classification Search
CPC .................................. H05B 3/145; H05B 3/03
See application file for complete search history.

(56) References Cited

U.S. PATENT DOCUMENTS

| | | | | |
|---|---|---|---|---|
| 2011/0020563 A1* | 1/2011 | Jiang | ........................ | H01J 37/20 977/890 |
| 2012/0298883 A1* | 11/2012 | Grogan | .................... | H01J 37/28 156/60 |
| 2013/0285213 A1* | 10/2013 | Wei | ..................... | H01L 21/0254 257/618 |
| 2019/0232631 A1* | 8/2019 | Cong | ...................... | B82Y 40/00 |
| 2019/0237294 A1* | 8/2019 | Cong | ...................... | H01J 37/20 |
| 2021/0118643 A1* | 4/2021 | Yuk | ...................... | H01J 37/3255 |

FOREIGN PATENT DOCUMENTS

| | | | | |
|---|---|---|---|---|
| CN | 208888121 U * | 5/2019 | | |
| JP | 2021068508 A * | 4/2021 | | |
| WO | WO-2022122985 A2 * | 6/2022 | .............. | H01J 37/20 |

* cited by examiner

*Primary Examiner* — Ryan C Clark
(74) *Attorney, Agent, or Firm* — ScienBiziP, P.C.

(57) ABSTRACT

A graphene heating chip includes a substrate, an insulating layer, a graphene film, and a plurality of electrodes. The substrate has two opposite a first surface and a second surface, and the substrate defines a through hole. The insulating layer is suspended on the substrate. The insulating layer covering the through hole and not in direct contact with the first surface is defined as a window, and a plurality of grooves are formed on the window. The graphene film covers the window, and the graphene film includes a first graphene film portion and a second graphene film portion, and the first graphene film portion and the second graphene film portion are spaced apart from each other. The plurality of electrodes are located on the surface of the insulating layer away from the substrate. The present application also provides a method for making the graphene heating chip.

14 Claims, 11 Drawing Sheets

GRAPHENE HEATING CHIP AND METHOD FOR MAKING THE SAME

FIELD

The present application relates to a graphene heating chip and a method for making the graphene heating chip, in particular to a graphene heating chip applied to an in-situ transmission electron microscope (TEM) and a method for making the graphene heating chip.

BACKGROUND

The combination of microelectromechanical systems (MEMS) and transmission electron microscopy (TEM) has led to tremendous progress in in situ TEM characterization. The observation of microscopic dynamic processes by TEM has ultra-high spatial resolution. It is well known that sub-angstrom spatial resolution can be achieved by spherical aberration-corrected TEM. Many in situ TEM techniques have been developed, and the situ TEM techniques include in situ heating, in situ biasing, in situ stress, and in situ ventilation. The main functional component of the TEM micro-heater chip is the electronically transparent window, which is usually formed by depositing a metal resistance wire on a suspended silicon nitride ($SiN_X$) film, and the metal resistance layer and the $SiN_X$ film form a double-layer structure. This micro-heater has an ultra-low heat capacity, enabling low power consumption and fast and precise temperature control. However, the thermal expansion coefficients of the metal resistive layer and the $SiN_X$ film are different, so that the electron-transparent window will swell at high temperature, and the sample may move out of the best focus. Thus, the expansion of the electron-transparent window can seriously affect the dynamic observation of the sample during the TEM characterization process.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
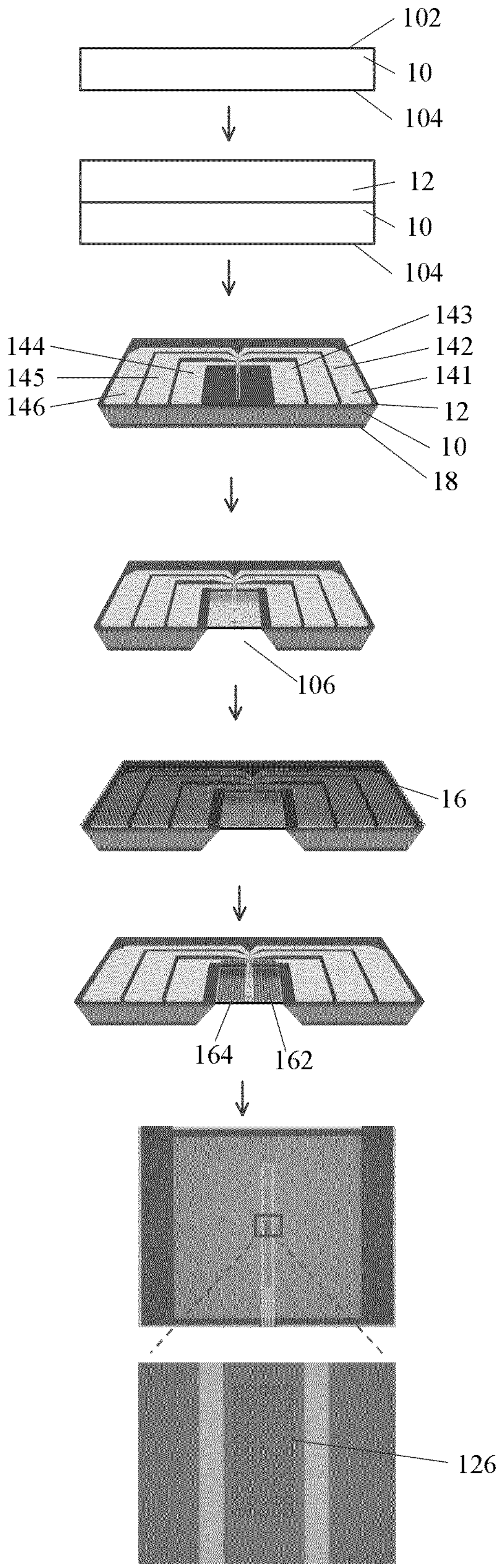
FIG. 1 shows a flowchart of a method for making a graphene heating chip in a first embodiment of the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to be considered as limiting the scope of the embodiments described herein.

The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 3:
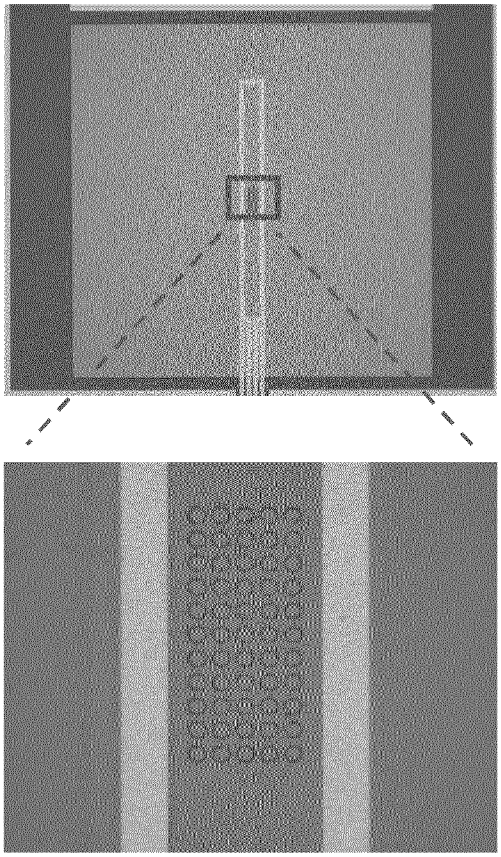
FIG. 3 shows a microscope photo of a sample cell in the first embodiment of the present application.
Figure 5:
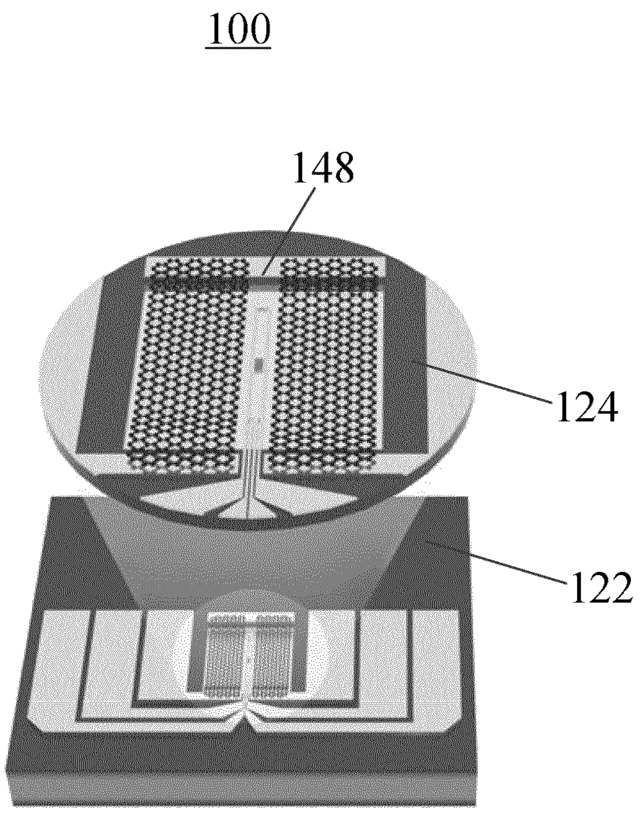
FIG. 5 shows a schematic view of a graphene heating chip in a second embodiment of the present application.

Referring to FIGS. 1 and 5, a method for making a graphene heating chip 100 in a first embodiment of the present application includes the following steps:

S1, providing a substrate 10, wherein the substrate 10 has a first surface 102 and a second surface 104 opposite to the first surface 102;

S2, placing an insulating layer 12 on the first surface 102;

S3, placing seven electrodes on a surface of the insulating layer 12 away from the substrate 10, wherein the seven electrodes are sequentially named as a first electrode 141, a second electrode 142, a third electrode 143, a fourth electrode 144, a fifth electrode 145, a sixth electrode 146, and a seventh electrode 148;

S4, forming a through hole 106 in the substrate 10, wherein the through hole 106 extends from the first surface 102 to the second surface 104, so that the insulating layer 12 is suspended at the through hole 106; and the insulating layer 12 covering the through hole 106 and not in direct contact with the first surface 102 is defined as a window, and the insulating layer 12 covering the through hole 106 and spaced apart from the first surface 102 is defined as the window, S5, placing a graphene film 16 on a surface of the insulating layer 12 away from the substrate 10, wherein the graphene film 16 covers the window;

S6, removing the graphene film 16 except the graphene film 16 covering the window, so that the first electrode 141, the second electrode 142, the third electrode 143, the fourth electrode 144, the fifth electrode 145, the sixth electrode 146, and the seventh electrode 148 are exposed; and the graphene film 16 at the window is cut into a first graphene film portion 162 and a second graphene film portion 164, and the first graphene film portion 162 and the second graphene film portion 164 are spaced apart from each other and arranged side by side; the third electrode 143 is in direct contact with the first graphene film portion 162, and the first electrode 141 and the second electrode 142 are located on a side of the third electrode 143 away from the first graphene film portion 162; the fourth electrode 144 is in direct contact with the second graphene film portion 164, and the fifth electrode 145 and the sixth electrode 146 are located on a side of the fourth electrode 144 away from the second graphene film portion 164; the first electrode 141 is in direct contact with the second electrode 142, the fifth electrode 145 is in direct contact with the sixth electrode 146, and the second electrode 142 is in direct contact with the fifth electrode 145; the first graphene film portion 162 and the second graphene film portion 164 are in direct contact with the seventh electrode 148, and the first electrode 141, the second electrode 142, the third electrode 143, the fourth electrode 144, the fifth electrode 145, and the sixth electrode 146 are not in contact with the seventh electrode 148; and S7, forming a plurality of grooves 126 on the insulating layer 12 between the first graphene film portion 162 and the second graphene film portion 164 as a sample cell for carrying samples, as shown in FIG. 3.

During step S1, the material of the substrate 10 can be a conductor, a semiconductor or an insulating material. Specifically, the material of the substrate 10 can be gallium nitride, gallium arsenide, sapphire, aluminum oxide, magnesium oxide, silicon, silicon dioxide, silicon nitride, quartz, glass, or the like. The material of the substrate 10 can also be a flexible material such as polyethylene terephthalate (PET) and polyimide (PI), or the like. Furthermore, the material of the substrate 10 can also be a doped semiconductor material, such as P-type gallium nitride, N-type gallium nitride, or the like. The size, thickness and shape of the substrate 10 are not limited and can be selected according to actual needs. In one embodiment, the substrate 10 is a silicon wafer with a thickness of 200 nm (nanometer) of silicon oxide.

During step S2, the material of the insulating layer 12 can be silicon nitride ($SiN_X$), silicon carbide, and so on. The insulating layer 12 is thin and transparent to electrons. The thickness of the insulating layer 12 is in a range from 50 nm to 200 nm. In one embodiment, the insulating layer 12 is a silicon nitride ($SiN_X$) film. In one embodiment, the insulating layer 12 is a silicon nitride ($SiN_X$) film with a thickness of 200 nm.

During step S3, the first electrode 141 to the seventh electrode 148 (that is the first electrode 141, the second electrode 142, the third electrode 143, the fourth electrode 144, the fifth electrode 145, the sixth electrode 146, and the seventh electrode 148) has better conductivity. Specifically, the materials of the first electrode 141 to the seventh electrode 148 can be metals, alloys, indium tin oxide (ITO), antimony tin oxide (ATO), conductive silver glues, conductive polymers, and metallic carbon nanometers, and so on. According to different types of materials for forming the first electrodes 141 to the seventh electrodes 148, the first electrodes 141 to the seventh electrodes 148 can be formed by different methods. When the materials of the first electrode 141 to the seventh electrode 148 are metals, alloys, ITO or ATO, the first electrode 141 to the seventh electrode 148 can be formed by methods such as evaporation, sputtering, deposition, masking and etching. When the materials of the first electrode 141 to the seventh electrode 148 are conductive silver glues, conductive polymers or carbon nanotube films, the conductive silver glues or the carbon nanotube films can be coated by printing or directly attached on the surface of the insulating layer 12 away from the substrate 10 to form the first electrode 141 to the seventh electrode 148. The thicknesses of the first electrode 141 to the seventh electrode 148 are in a range from 0.5 nanometers to 100 micrometers. In one embodiment, the first electrode 141 to the seventh electrode 148 are Cr/Pt electrodes formed by electron beam evaporation, and the Cr/Pt electrodes are formed by depositing 5 nm thick Cr (chromium) on 50 nm thick Pt (Platinum).

During step S4, the insulating layer 12 can be considered as two parts, one part is in direct contact with the first surface 102, and the other part covers the through hole 106 and is not in direct contact with the first surface 102. The method for forming the through hole 106 is not limited, such as plasma etching, laser and other methods. A method for forming the through hole 106 of this embodiment includes the following steps:

S41, disposing a barrier layer 18 on the second surface 104 of the substrate 10; S42, etching an opening on the barrier layer 18, wherein the second surface 104 of the substrate 10 is exposed through the opening; and S43, putting the substrate 10 and the etched barrier layer 18 into an etching solution, or dripping the etching solution into the opening, wherein the etching solution contacts the substrate 10 through the opening, and the etching solution chemically reacts with the substrate 10 to form the through holes 106 on the substrate 10; and the opening corresponds to the through holes 106 one-to-one, the insulating layer 12 is suspended at the opening and the through holes 106, and the insulating layer 12 is exposed through the opening and the through hole 106.

During step S41, the material of the barrier layer 18 does not chemically react with the etching solution. In one embodiment, the substrate 10 is a silicon wafer with a layer of silicon dioxide on both the first surface 102 and the second surface 104, and the barrier layer 18 is the silicon nitride ($SiN_x$) film.

During step S42, the method of etching the opening is photolithography, plasma etching or the like.

During step S43, the etching solution does not react with the insulating layer 12 and the six electrodes, but only chemically reacts with the substrate 10, so that the through hole 106 is formed on the substrate 10. In one embodiment, the substrate 10 is a silicon wafer with a layer of silicon dioxide on both the first surface 102 and the second surface 104, and the etching solution is a potassium hydroxide (KOH) solution.

Further, after step S43, a step of removing the barrier layer 18 can also be included.

During step S5, in one embodiment, the thickness of the graphene film 16 is a single atomic layer, that is, the graphene film 16 is a single layer. The method for making the graphene film 16 includes the following steps:

S51, growing the graphene film 16 on a growth substrate 10;

S52, coating an adhesive layer on a surface of the graphene film 16 away from the growth substrate 10;

S53, removing the growth substrate 10;

S54, disposing the adhesive layer and the graphene film 16 on a surface of the insulating layer 12 away from the substrate 10, wherein the graphene film 16 is in direct contact with the insulating layer 12, and the graphene film 16 is located between the adhesive layer and the insulating layer 12; and S55, removing the adhesive layer.

During step S51, the method for growing the graphene film 16 on the growth substrate 10 is not limited. In one embodiment, the process of growing the graphene film 16 on the growth substrate 10 is as follows: depositing a catalyst layer on the growth substrate 10, then placing the growth substrate 10 deposited with the catalyst layer into a reaction chamber, and supplying the carbon source gas into the reaction chamber, wherein the reaction chamber is heated to a temperature from 800 degrees Celsius to 1000 degrees Celsius, so as to grow the graphene film 16 on the growth substrate 10.

The material of the growth substrate 10 can be copper, and the size of the growth substrate 10 is not limited and can be selected according to actual conditions.

A layer of metal or metal compound material is deposited on the surface of the growth substrate 10 to form the catalyst layer. The metal can be one of gold, silver, copper, iron, cobalt, and nickel, or any combination thereof. The metal compound can be one of zinc sulfide, zinc oxide, ferric nitrate, ferric chloride, copper chloride, or any combination thereof. The method for depositing the catalyst layer on the growth substrate 10 is not limited, such as chemical vapor deposition, physical vapor deposition, vacuum thermal evaporation, magnetron sputtering, plasma enhanced chemical vapor deposition, or printing, or the like.

The reaction chamber is a closed cavity, and the closed cavity has a gas inlet and a gas outlet. The gas inlet is used for introducing reactive gas, such as carbon source gas, etc., and the gas outlet is communicated with a vacuuming device. The vacuuming device controls the vacuum degree and gas pressure of the reaction chamber through the gas outlet. The reaction chamber further includes a water cooling device and a heating device for controlling the temperature in the reaction chamber. In one embodiment, the reaction chamber is a quartz tube.

The carbon source gas can be a compound such as methane, ethane, ethylene or acetylene. A non-oxidizing gas such as hydrogen can be introduced into the reaction chamber. Under the continuous introduction of non-oxidizing gas, when the temperature in the reaction chamber is in a range from 800 degrees Celsius to 1000 degrees Celsius, the carbon source gas is cracked, and carbon atoms are deposited on the surface of the catalyst layer to form the graphene film 16. A flow rate of the carbon source gas can be in a range of about 20 standard cubic centimeters per minute (sccm) to about 90 sccm, and the flow ratio of the non-oxidizing gas to the carbon source gas is in the range from 45:2 to 15:2. The reaction chamber can also be a vacuum environment, and the pressure of the reaction chamber is in a range from $10^{-1}$ Pa to $10^{-2}$ Pa. The constant temperature time for growing the graphene film 16 is in a range from 10 minutes to 60 minutes. In one embodiment, the pressure of the chamber is about 500 mTorr, the temperature of the chamber is about 1000 degrees Celsius, the flow rate of the carbon source gas is about 25 sccm, the carbon gas is methane, and the constant temperature period is about 30 minutes.

During step S52, the material of the adhesive layer is not limited, and the method of disposing the adhesive layer is also not limited, such as spin coating or deposition. In one embodiment, the material of the adhesive layer is PMMA (methyl methacrylate).

During step S53, the method for removing the growth substrate 10 is not limited, for example, the growth substrate 10 is removed by chemical etching. The material of the growth substrate 10 is copper, and the solution for removing the growth substrate 10 is sulfuric acid, nitric acid, hydrochloric acid, or a mixed solution composed of hydrogen peroxide, hydrochloric acid and deionized water (the volume ratio of hydrogen peroxide, hydrochloric acid and deionized water is 1:1:50). In one embodiment, the material of the growth substrate 10 is copper, and the solution for removing the growth substrate 10 is a mixture of hydrogen peroxide ($H_2O_2$), hydrochloric acid (HCL), and deionized water (DIW), and the volume ratio of the hydrogen peroxide, the hydrochloric acid, and the deionized water is: $H_2O_2$:HCL:DIW=1:1:50.

After removing the growth substrate 10, a step of cleaning with water or an organic solvent is further included to remove residual impurities. In one embodiment, the water is deionized water. The type of the organic solvent is not limited, such as isopropanol or the like.

During Step S55, the adhesive layer is removed by an organic solvent. The type of the organic solvent is not limited, such as acetone, ethanol and the like.

During step S6, the first electrode 141 is in direct contact with the second electrode 142, and the part of the first electrode 141 in direct contact with the second electrode 142 is located on the window. The fifth electrode 145 and the sixth electrode 146 are in direct contact, and the part where the fifth electrode 145 and the sixth electrode 146 are in direct contact is located on the window. The second electrode 142 is in direct contact with the fifth electrode 145, and the part of the second electrode 142 in direct contact with the fifth electrode 145 is located on the window. The part where the first electrode 141 is in direct contact with the second electrode 142, the part where the fifth electrode 145 and the sixth electrode 146 are in direct contact, and the part where the second electrode 142 is in direct contact with the fifth electrode 145 are located between the first graphene film portion 162 and the second graphene film portion 164, are not in direct contact with the first graphene film portion 162 and the second graphene film portion 164. That is, the first electrode 141, the second electrode 142, the fifth electrode 145, and the sixth electrode 146 do not directly contact the graphene film 16 and are electrically insulated from the graphene film 16. The first electrode 141, the second electrode 142, the fifth electrode 145, and the sixth electrode 146 are all in direct contact with each other. The first graphene film portion 162 and the second graphene film portion 164 are in direct contact with the seventh electrode 148. The first electrode 141, the second electrode 142, the third electrode 143, the fourth electrode 144, the fifth electrode 145, and the sixth electrode 146 are not in contact with the seventh electrode 148, are not electrically connected to the seventh electrode 148, as shown in FIG. 5.

In one embodiment, the graphene film 16 is transferred from the copper foil to the surface of the treated silicon wafer by wet transfer technology, and then the graphene film 16 is cut into two pieces on the $SiN_X$ window by photolithography and dry etching. Removing the graphene film 16 except the graphene film 16 covering the window is not limited.

In one embodiment, a method of patterning photolithography and then gas plasma etching is used to remove the graphene film 16 except the graphene films 16 on the window. Specifically, the graphene film 16 is covered with a mask, the mask has a hole, the graphene film 16 on the window is in direct contact with the mask, and the graphene film 16 except the graphene film 16 on the window is exposed through the hole. The graphene film 16 exposed through the hole is etched and removed by the gas plasma, and finally the mask is removed.

During step S7, the method for forming the sample cell by forming a plurality of the grooves 126 on the insulating layer 12 is not limited, for example, a method of patterning photolithography and then gas plasma etching is adopted. Specifically, the graphene film 16 is covered with a mask, the mask has a plurality of holes, the plurality of places where the grooves 126 are to be formed on the insulating layer 12 ($SiN_X$ film) are exposed through these holes, and the other places are covered by the mask. The insulating layer 12 exposed through these holes are etched by the gas plasma, thereby forming the plurality of grooves 126 spaced apart from each other on the insulating layer 12, and finally removing the mask. The shapes of the grooves 126 are not limited, and the thickness of each groove 126 is in a range from 1 nm to 100 nm. In one embodiment, the thickness of each groove 126 is 10 nm, 20 nm, 30 nm, 40 nm or 50 nm. Since the grooves 126 are formed by etching on the insulating layer 12, the thickness of the grooves 126 is thinner, thereby ensuring that the thickness of the sample cell is thin enough to allow electrons to pass through, or to be transparent to the electrons. In one embodiment, the thickness of the groove 126 is 50 nm.

A specific embodiment is used below to describe the method for making the graphene heating chip 100, but it is not limited thereto.

Figure 2:
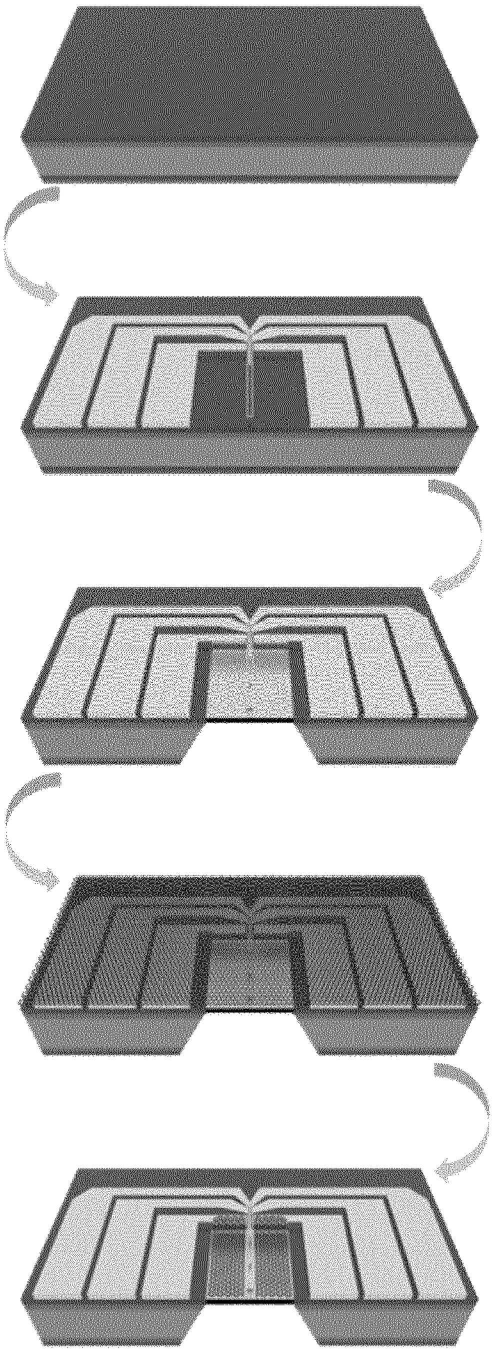
FIG. 2 shows a flowchart of a method for making a graphene heating chip in a specific example of the present application.
Figure 4:
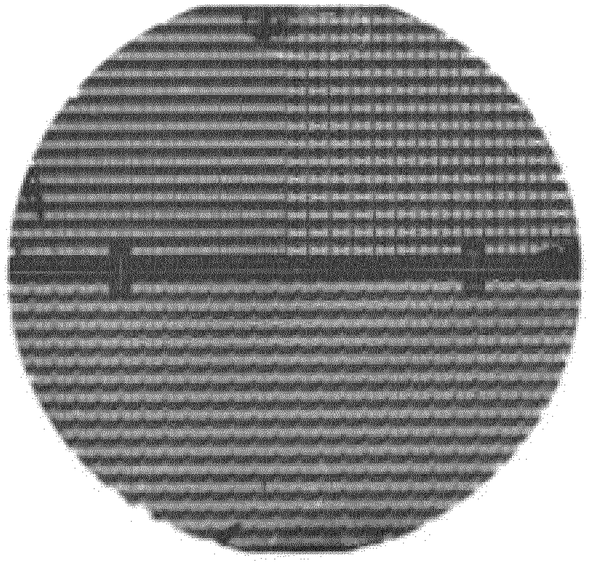
FIG. 4 shows a wafer-level graphene heating chip prepared in batches in the first embodiment of the present application.

Referring to FIG. 2, the substrate 10 is a silicon wafer with a $SiO_2$ layer on two opposite surfaces, and then a $SiN_X$ film is arranged on each $SiO_2$ layer to form a five-layer structure of $SiN_X$ (200 nm in thickness)/$SiO_2$ (200 in thickness) nm)/Si (400 μm thick)/$SiO_2$ (200 nm thick)/$SiN_X$ (200 nm thick), as shown in the first figure in FIG. 2. A patterned 5 nm/50 nm thick Cr/Pt electrode was deposited on the top $SiN_X$ film by e-beam evaporation to form six electrode pads, as shown in the second figure in FIG. 2. Then, from the bottom $SiN_X$ film upwards, according to the photolithography and the gas plasma etching methods (the gas is CF4, the gas flow is 40 sccm, the pressure is 2 Pa, the power is 50 W, and the etching time is 5.5 min), the $SiO_2/SiN_X$ layer under the silicon wafer in the five-layer structure $SiN_X/SiO_2/Si/SiO_2/SiN_X$ is etched to form an opening, and a part of the silicon wafer is exposed. After 8 hours of KOH solvent etching, the silicon wafer and the $SiO_2$ film on top surface of the silicon wafer are also etched to form the through holes 106. That is, in the five-layer structure $SiN_X/SiO_2/Si/SiO_2/SiN_X$, the four layers except for the top $SiN_X$ film are etched to form the through holes 106, and the top $SiN_X$ film is suspended and covers the through holes 106, thereby forming a square window. The area of the $SiN_X$ film suspended at the through hole 106 is 730 μm×730 μm, and the thickness of the $SiN_X$ film suspended at the through hole 106 is 200 nm, as shown in the third figure in FIG. 2. To ensure that the sample cell is thin enough to allow electrons to pass through, a secondary gas plasma etching method is used to etch the suspended $SiN_X$ membrane (the gas is CF4, the gas flow is 40 sccm, the pressure is 2 Pa, the power is 50 W, and the etching time is 4.5 min) to form the sample cell with a thickness of 50 nm and a diameter of 3 μm, as shown in FIG. 3. The graphene sheet is transferred onto the top $SiN_X$ membrane by the transfer method. Using the method of photolithography and gas plasma etching (the gas is 02, the gas flow rate is 40 sccm, the pressure is 2 Pa, the power is 20 W, and the etching time is 20 s), the graphene sheet is cut into two pieces, and the graphene sheet except the graphene sheet at the square window is etched and removed, so as to expose the six electrode pads, as shown in the fourth figure in FIG. 2. In this way, the graphene heating chip 100 is obtained. In addition, as shown in FIG. 4, a plurality of graphene heating chips 100 can be directly formed on a 4-inch wafer at the same time to form a wafer-level graphene heating chip 100. Then, it is cut with a diamond saw to obtain a single graphene heating chip 100.

Figure 6:
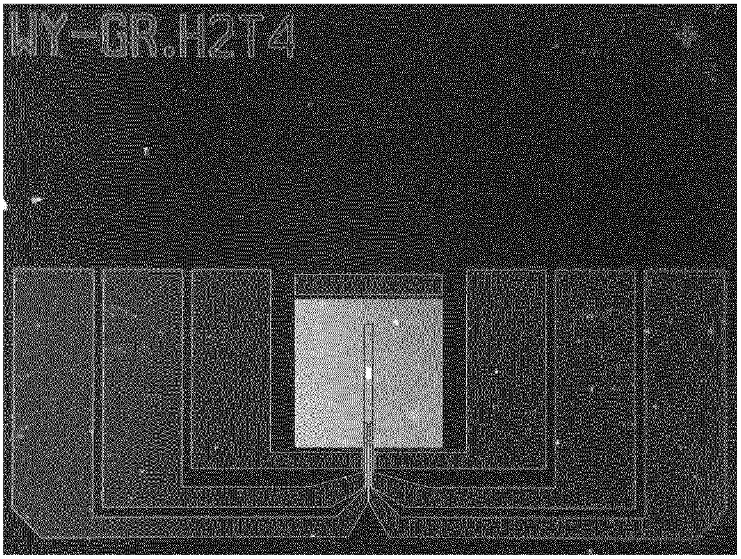
FIG. 6 shows a stereomicroscope photo of the graphene heating chip in the second embodiment of the present application.

Referring to FIG. 3, FIG. 5, and FIG. 6, a graphene heating chip 100 of a second embodiment of the present application is provided. The graphene heating chip 100 includes the substrate 10, the insulating layer 12, the graphene film 16, and six electrodes.

The substrate 10 has the first surface 102 and the second surface 104 opposite to the first surface 102. The substrate 10 defines the through hole 106, and the through hole 106 extends from the first surface 102 to the second surface 104.

The insulating layer 12 is located on the first surface 102, and the insulating layer 12 is suspended on the first surface 102 and covers the through hole 106. The insulating layer 12 consists of a first insulating layer portion 122 and a second insulating layer portion 124, and the first insulating layer portion 122 and the second insulating layer portion 124 are arranged side by side and in direct contact with each other. The first insulating layer portion 122 is in direct contact with the first surface 102 of the substrate 10. The second insulating layer portion 124 covers the through hole 106 and does not directly contact with the first surface 102, and the second insulating layer portion 124 is the window. The plurality of grooves 126 are formed on the second insulating layer portion 124 as sample cells for supporting the samples. That is, the sample cells are located in the second insulating layer portion 124.

The six electrodes are located on the surface of the insulating layer 12 away from the substrate 10. The six electrodes are located on the surface of the first insulating layer portion 122 away from the substrate 10. The six electrodes are named as the first electrode 141, the second electrode 142, the third electrode 143, the fourth electrode 144, the fifth electrode 145, and the sixth electrode 146 in sequence. The second insulating layer portion 124 has a first side and a second side opposite to the first side. The first electrode 141, the second electrode 142, and the third electrode 143 are located on the first side. The fourth electrode 144, the fifth electrode 145, and the sixth electrode 146 are located on the second side. That is, from left to right, the six electrodes are named as the first electrode 141, the second electrode 142, the third electrode 143, the fourth electrode 144, the fifth electrode 145, and the sixth electrode 146.

The graphene film 16 is located on the surface of the second insulating layer portion 124 away from the substrate 10, and the graphene film 16 covers the window. In one embodiment, the graphene film 16 is located only on the second insulating layer portion 124 or only on the window. The graphene film 16 consists of the first graphene film portion 162 and the second graphene film portion 164, and the first graphene film portion 162 and the second graphene film portion 164 are arranged side by side and spaced apart from each other. The third electrode 143 is in direct contact with the first graphene film portion 162, and the first electrode 141 and the second electrode 142 are both located on the side of the third electrode 143 away from the first graphene film portion 162. The fourth electrode 144 is in direct contact with the second graphene film portion 164, and the fifth electrode 145 and the sixth electrode 146 are both located on the side of the fourth electrode 144 away from the second graphene film portion 164. The first electrode 141 is in direct contact with the second electrode 142, the fifth electrode 145 is in direct contact with the sixth electrode 146, and the second electrode 142 is in direct contact with the fifth electrode 145.

The first electrode 141 is in direct contact with the second electrode 142, and the part where the first electrode 141 and the second electrode 142 are in direct contact with each other is located on the second insulating layer portion 124. The fifth electrode 145 is in direct contact with the sixth electrode 146, and the part where the fifth electrode 145 and the sixth electrode 146 are in direct contact with each other is located on the second insulating layer portion 124. The second electrode 142 is in direct contact with the fifth electrode 145, and the part where the second electrode 142 and the fifth electrode 145 are in direct contact with each other is located on the second insulating layer portion 124. The part where the first electrode 141 and the second electrode 142 are in direct contact with each other, the part where the fifth electrode 145 and the sixth electrode 146 are in direct contact with each other, and the part where the second electrode 142 and the fifth electrode 145 are in direct contact with each other, are located between the first graphene film portion 162 and the second graphene film portion 164, and are not in direct contact with the first graphene film portion 162 and the second graphene film portion 164. That is, the first electrode 141, the second electrode 142, the fifth electrode 145, and the sixth electrode 146 do not directly contact with the graphene film 16, and are also not electrically connected to the graphene film 16.

The plurality of grooves 126 are located between the first graphene film portion 162 and the second graphene film portion 164. That is, the sample cell formed by the plurality of grooves 126 is located on the insulating layer 12 between the first graphene film portion 162 and the second graphene film portion 164.

The graphene heating chip 100 can further includes the barrier layer 18, and the barrier layer 18 is located on the second surface of the substrate 10. The barrier layer 18 defines the opening, and the opening corresponds to the through hole 106 one-to-one. The insulating layer 12 is suspended on the substrate 10 and covers the opening and the through hole 106, and the insulating layer 12 is exposed through the opening and through hole 106.

The material and size of the substrate 10, the insulating layer 12, the graphene film 16, the electrodes, and the shape and size of the grooves 126 have been described in detail in the first embodiment.

In one embodiment, the thickness of the $SiN_X$ film at each groove 126 is 50 nm, which ensures that the $SiN_X$ film is electronically transparent under the transmission electron microscope (TEM), allowing electrons to pass through the $SiN_X$ film.

The following is the performance characterization of the graphene heating chip 100.

FIG. 3 shows a microscope photograph of the sample cells. The sample cells are located in the center of the window, as shown by the rectangular area in FIG. 3, and the sample cells consist of the plurality of circular grooves 126.

Figure 7:
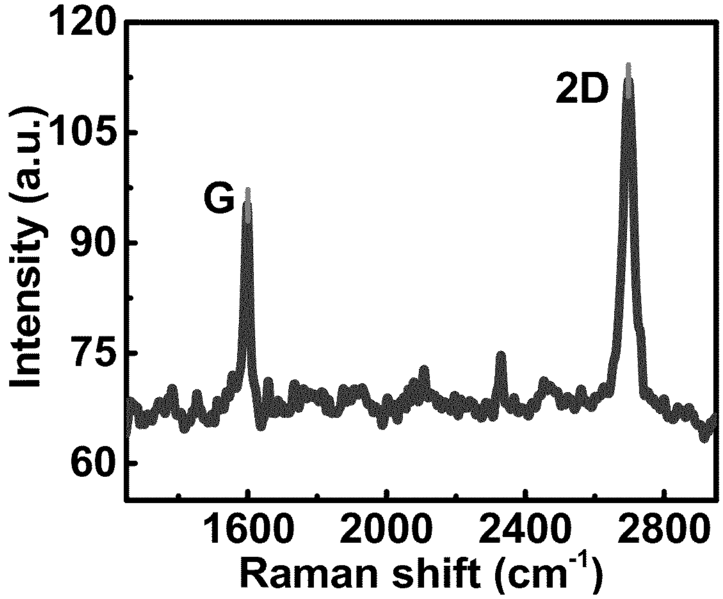
FIG. 7 shows the Raman spectrum of a graphene film of the graphene heating chip in the second embodiment of the present application.

FIG. 7 shows the Raman spectrum of the graphene film 16 in the graphene heating chip 100. It can be seen from FIG. 7 that the graphene film 16 is a single layer.

Figure 8:
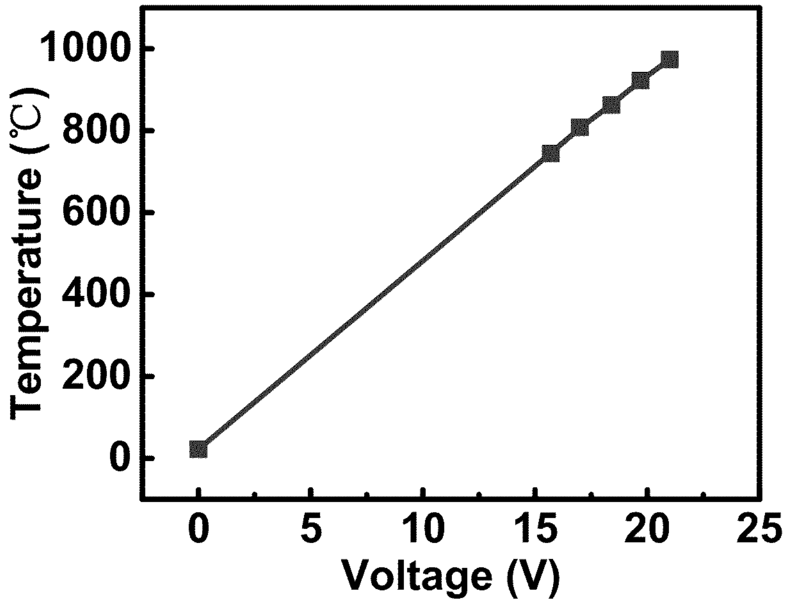
FIG. 8 shows a temperature-voltage straight line of the graphene heating chip in the second embodiment of the present application.

FIG. 8 shows a temperature-voltage line of the graphene heating chip 100, wherein the voltage is applied to the graphene film 16. It can be seen from FIG. 8 that the graphene heating chip 100 can be heated to 1000 degrees Celsius within 30 mS (microseconds).

Figure 9:
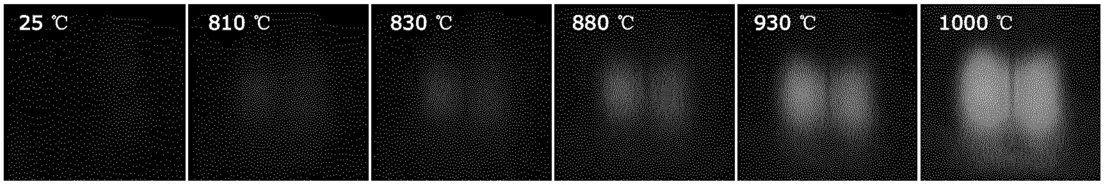
FIG. 9 shows a photo of a suspended $SiN_X$ film at a high temperature in the second embodiment of the present application, which is taken by a Canon camera with a macro lens.

FIG. 9 shows a photograph of the suspended $SiN_X$ film (that is the second insulating layer portion 124, or the window) at a high temperature, taken by a Canon camera with a macro lens. It can be seen from FIG. 9 that the suspended $SiN_X$ film will become brighter and brighter with the increase of heating power, indicating that the heating temperature distribution of the sample cell area in the graphene heater is uniform, which is beneficial to in-situ TEM observation.

The graphene film 16 is used as a resistance layer for heating, which can effectively heat the suspended $SiN_X$ film (that is, the first insulating layer portion 122), and the temperature can be controlled by the input power. Although the power is evenly applied to the $SiN_X$ window, the central area of the window is hotter than the edges of the window, because the silicon surrounding the suspended $SiN_X$ film can be viewed as a heat sink, and Joule heat is conducted from the center of the $SiN_X$ film to the heat sink, causing a temperature gradient on the $SiN_X$ film. Compared with the current local heating of the metal wire, the graphene film 16 heats entire suspended $SiN_X$ film, which can effectively reduce the temperature gradient and improve the temperature uniformity in the central area of the $SiN_X$ film, wherein the sample cells are located in the central area. Therefore, the heating temperature distribution in the sample cell area is uniform, which is favorable for in situ TEM observation.

Figure 10:
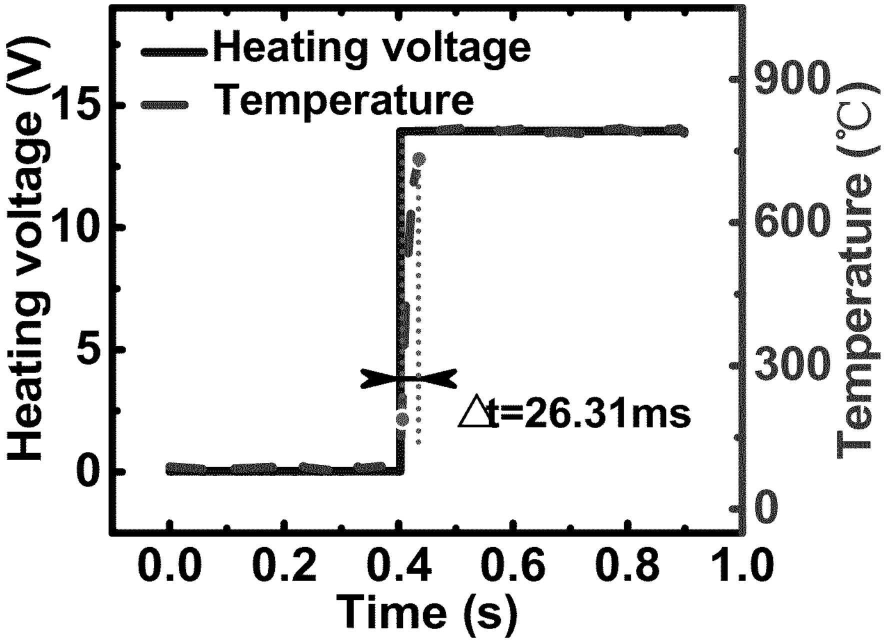
FIG. 10 shows a heating curve of the graphene heating chip at 800 degrees Celsius in the second embodiment of the present application.

FIG. 10 shows a heating curve of the graphene heating chip 100 at 800 degrees Celsius. It can be seen from FIG. 10 that the graphene heating chip 100 can be heated to 800 degrees Celsius within 26.31 microseconds, indicating that the graphene heating chip 100 has a fast response speed, which can be attributed to the fact that the graphene film 16 is a single layer. The single layer graphene greatly reduces the heat capacity of the graphene heating chip 100, and the van der Waals contact between the graphene film 16 and the $SiN_X$ film significantly reduces the interface interaction between the graphene film 16 and the $SiN_X$ film.

Gold (Au) nanoparticles are deposited in the sample cells of the graphene heating chip 100, the sample cells are imaged under TEM, and the deformation (expansion) of the sample cells is observed.

Figure 11:
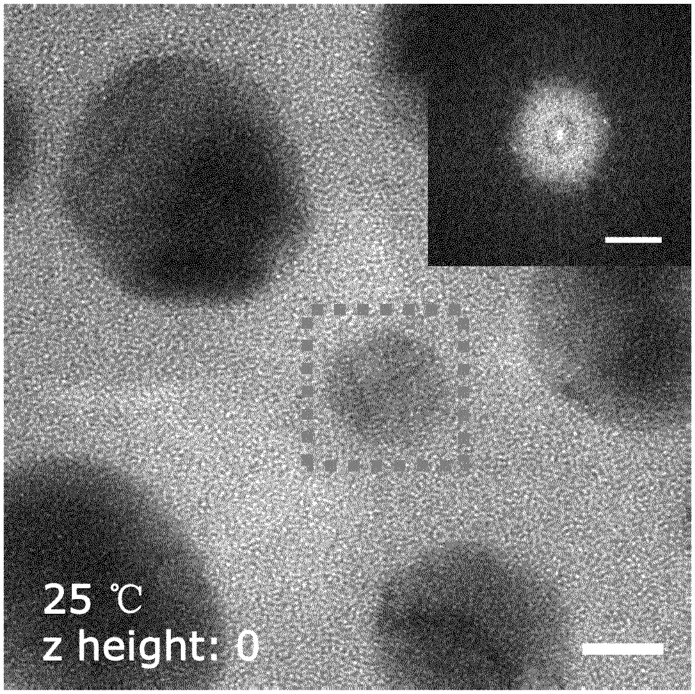
FIG. 11 shows a transmission electron microscopy (TEM) image of gold particles with the highest resolution concentric height at room temperature in the second embodiment of the present application.
Figure 12:
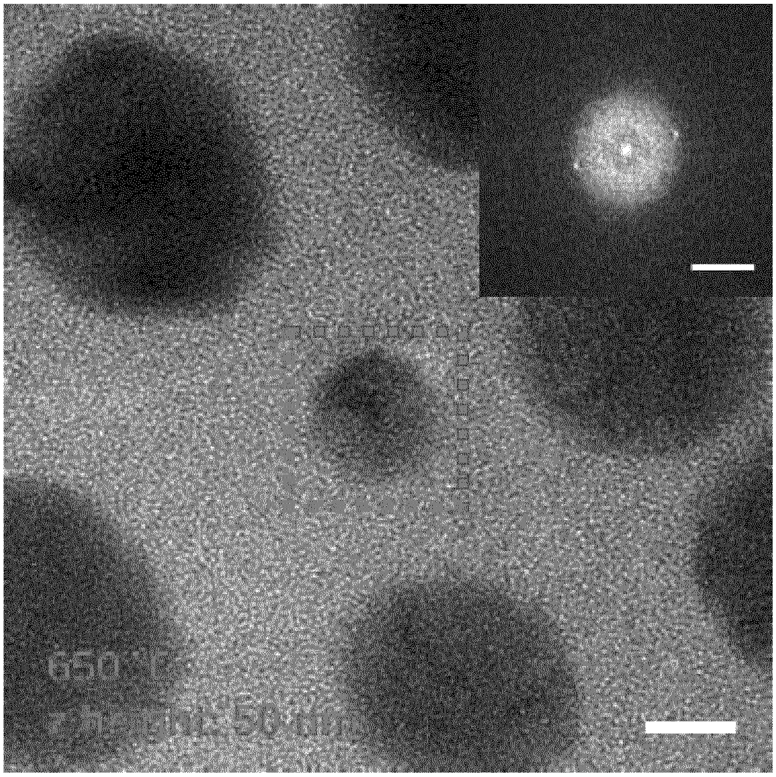
FIG. 12 shows a TEM image of the gold particles heated to 650 degrees Celsius in the second embodiment of the present application.

FIG. 11 shows a TEM focused image of Au particles at room temperature without defocusing at a concentric height, and it can be seen from FIG. 11 that a gold lattice can be observed. FIG. 12 shows a TEM image of a gold particle heated to 650 degrees Celsius with a z height change of 50 nm. The change in z height is the expansion of the sample cell. It can be seen that at 650 degrees Celsius, the change in z height is 50 nm, that is, the expansion of the sample cell at 650 degrees Celsius is 50 nm.

In conventional MEMS heaters, the membrane window of the double-lattice structure is usually a self-supporting film composed of a metal resistive layer and a $SiN_X$ film. Since the metal resistance layer is formed on the $SiN_X$ film by a thin film process, the interfacial adhesion between the metal resistance layer and the $SiN_X$ film is strong. Due to the strong interfacial adhesion, the metal resistive layer and the $SiN_X$ film generate strong interfacial stress, resulting in the severe expansion of the electron-transparent window formed by the metal resistive layer and the $SiN_X$ film. In the graphene heating chip 100, the graphene is a two-dimensional van der Waals material, and the surface of graphene has no dangling bonds. The graphene film 16 is in contact with the $SiN_X$ film through weak van der Waals forces, resulting in weak interfacial stress between the graphene film 16 and the $SiN_X$ film. Therefore, compared with the conventional MEMS heater, the expansion of the graphene film 16 and the $SiN_X$ film in the graphene heating chip 100 is significantly suppressed. It can be seen that the expansion amplitude of the sample cell at 650 degrees Celsius is only 50 nm, and the success of expansion suppression can be attributed to the introduction of the graphene resistance layer. The single layer graphene greatly reduces the heat capacity of the graphene heating chip 100, and the van der Waals contact between the graphene and the $SiN_X$ film significantly reduces the interfacial interaction between the graphene and the $SiN_X$ film.

Figure 13:
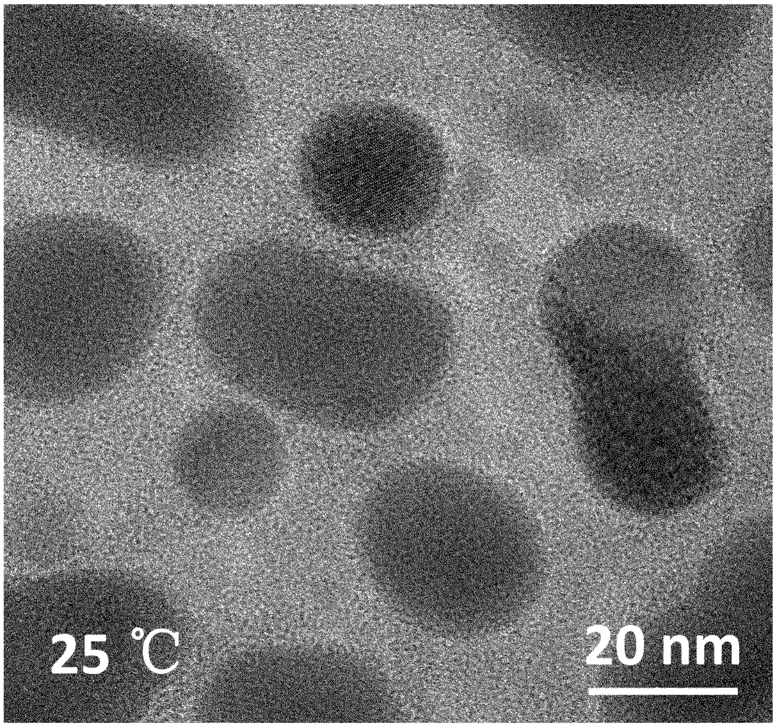
FIG. 13 shows a TEM image of tin nanoparticles at room temperature in the second embodiment of the present application.
Figure 14:
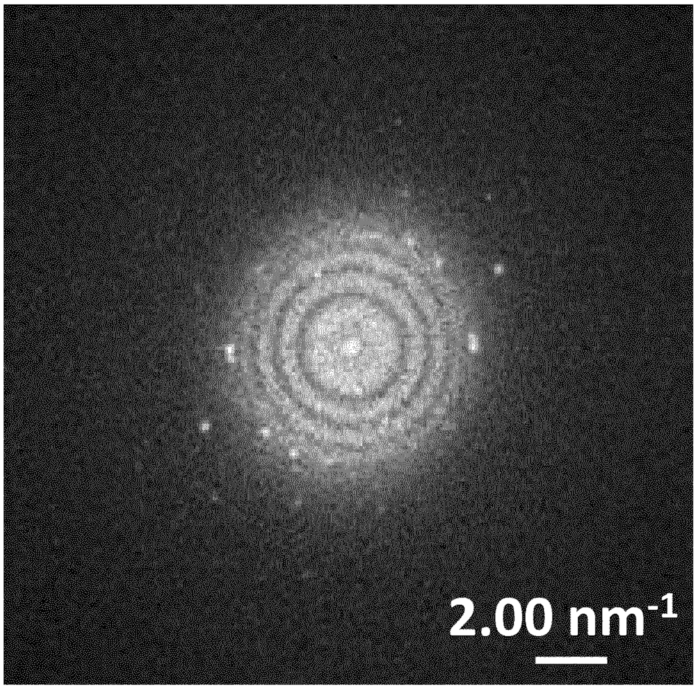
FIG. 14 shows a fast Fourier transform image of FIG. 13.
Figure 15:
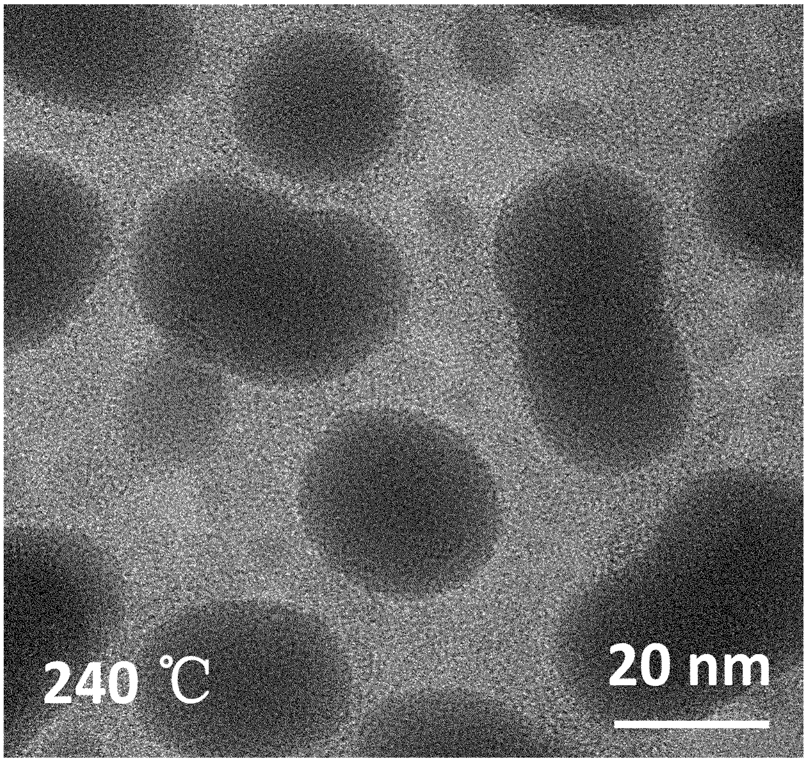
FIG. 15 shows a TEM image of the tin nanoparticles at 240 degrees Celsius in the second embodiment of the present application.
Figure 16:
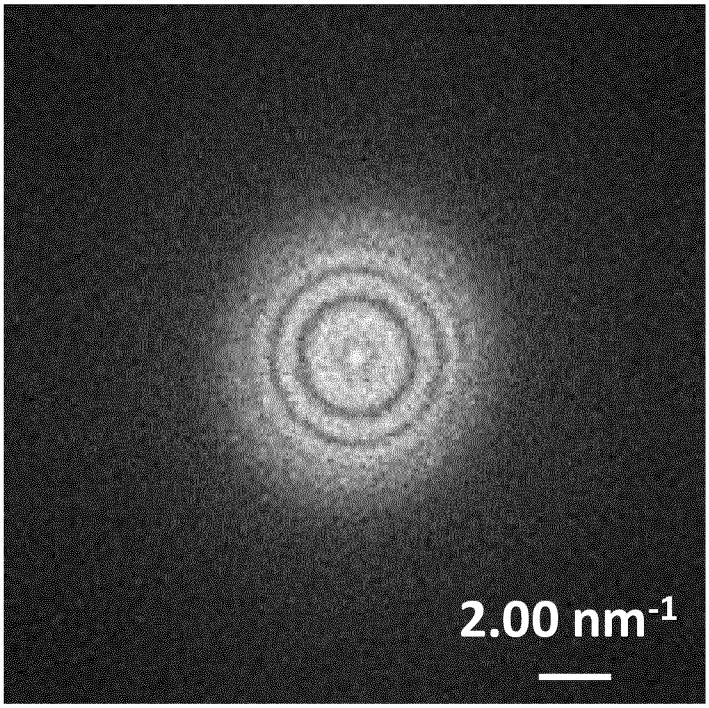
FIG. 16 shows a fast Fourier transform image of FIG. 15.

The melting process of tin (Sn) nanoparticles is observed in situ through the graphene heating chip 100, as shown in FIGS. 13 to 16. FIG. 13 shows a TEM image of Sn particles at room temperature. As seen from FIG. 13, the Sn nanoparticles can be observed, wherein the lattice space with (200) crystal plane is 0.29 nm. FIG. 14 shows the corresponding fast Fourier transform image of FIG. 13, confirming that the Sn nanoparticles have the crystalline structures. FIG. 15 shows a TEM image of the Sn nanoparticles at 240 degrees Celsius. As seen from FIG. 15, the TEM image at the same position does not show the crystal lattice of the Sn nanoparticles, indicating that the Sn nanoparticles have been melted into a liquid. FIG. 16 shows a fast Fourier transform image corresponding to FIG. 15, confirming the phase transition of pattern disappearance. FIGS. 13 to 16 show that the graphene heating chip 100 can effectively solve the thermodynamic process in the in-situ TEM observation.

The graphene heating chip 100 and the method for making the graphene heating chip 100 have the following advantages: first, the graphene heating chip 100 has a fast response speed, and can be heated to 800 degrees Celsius within 26.31 mS, and heated to 1000 degrees Celsius within 30 mS; second, the expansion or deformation of the sample cell in the graphene heating chip 100 is very small, and the expansion or deformation of the sample cell at 650 degrees Celsius is only 50 nm; third, the graphene heating chip 100 can perform dynamic observation during TEM characterization of the sample; fourth, the method for making the graphene heating chip 100 is simple, and the graphene heating chip 100 can be prepared on a large scale.

Figure 17:
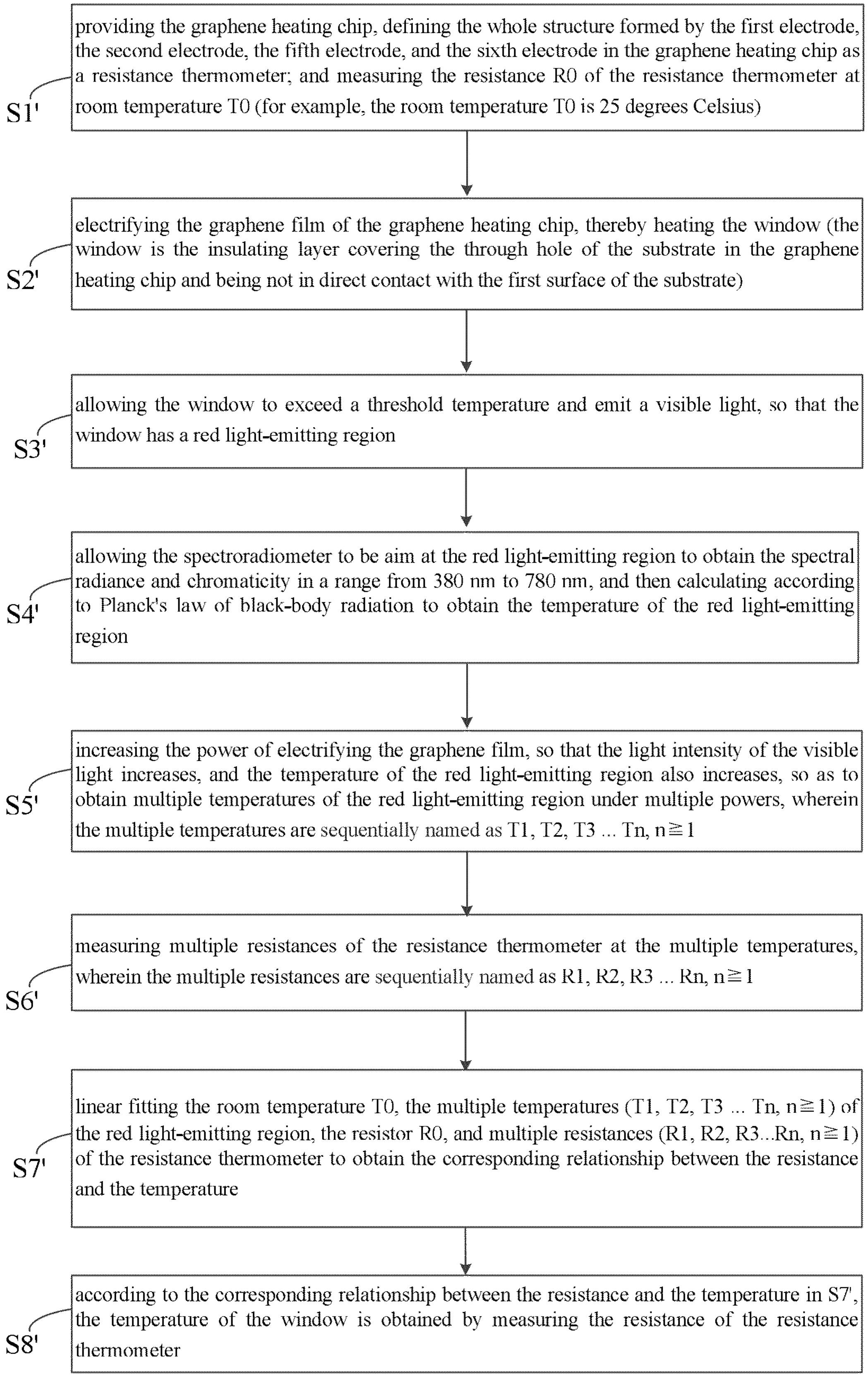
FIG. 17 shows a method for calibrating the temperature of the graphene heating chip in a third embodiment of the present application.

Referring to FIG. 17, a method for calibrating the temperature of the graphene heating chip 100 in a third embodiment of the present application includes the following steps:

S1', providing the graphene heating chip 100, defining the whole structure formed by the first electrode 141, the second electrode 142, the fifth electrode 145, and the sixth electrode 146 in the graphene heating chip 100 as a resistance thermometer; and measuring the resistance R0 of the resistance thermometer at room temperature T0 (for example, the room temperature T0 is 25 degrees Celsius);

S2', electrifying the graphene film 16 of the graphene heating chip 100, thereby heating the window (the window is the insulating layer 12 covering the through hole 106 of the substrate 10 in the graphene heating chip 100 and being not in direct contact with the first surface 102 of the substrate 10);

S3', allowing the window to exceed a threshold temperature and emit a visible light, so that the window has a red light-emitting region;

S4', allowing the spectroradiometer to be aim at the red light-emitting region to obtain the spectral radiance and chromaticity in a range from 380 nm to 780 nm, and then calculating according to Planck's law of black-body radiation to obtain the temperature of the red light-emitting region;

S5', increasing the power of electrifying the graphene film 16, so that the light intensity of the visible light increases, and the temperature of the red light-emitting region also increases, so as to obtain multiple temperatures of the red light-emitting region under multiple powers, wherein the multiple temperatures are sequentially named as T1, T2, T3 . . . Tn, n≥1;

S6', measuring multiple resistances of the resistance thermometer at the multiple temperatures, wherein the multiple resistances are sequentially named as R1, R2, R3 . . . Rn, n≥1;

S7', linear fitting the room temperature T0, the multiple temperatures (T1, T2, T3 . . . Tn, n≥1) of the red light-emitting region, the resistor R0, and multiple resistances (R1, R2, R3 . . . Rn, n≥1) of the resistance thermometer to obtain the corresponding relationship between the resistance and the temperature; and S8', according to the corresponding relationship between the resistance and the temperature in S7', the temperature of the window is obtained by measuring the resistance of the resistance thermometer.

During step S1', in one embodiment, the materials of the first electrode 141, the second electrode 142, the fifth electrode 145, and the sixth electrode 146 are platinum; and the resistance R0 of the resistance thermometer at room temperature T0 (25 degrees Celsius) is measured by a four-probe method.

During step S3', in one embodiment, the material of the insulating layer 12 is $SiN_X$, and the window starts to emit visible light when the window exceeds 600 degrees Celsius.

During step S4', Planck's law of black body radiation is the relationship between the emissivity and frequency of electromagnetic radiation emitted from a blackbody at any temperature. The distribution shape of the radiance of a black body with wavelength is regular, and the emissivity of a black body is proportional to the fourth power of the absolute temperature T of the black body. At a high temperature, the heating window of the insulating layer 12 will start to emit light, and the intensity of the light will gradually increase as the heating power increases. By measuring the spectral intensity of visible light and fitting it according to the Planck's law of black body radiation, the temperature of the window at high temperature can be obtained. That is, according to the Planck's law of black body radiation, the temperature of the suspended window (i.e., the suspended second insulating layer 124) in the graphene heating chip 100 at high temperature can be obtained, but the temperature of the suspended window (i.e., the suspended second insulating layer 124) in the graphene heating chip 100 at low temperature cannot be obtained. Since the sample cell is located in the second insulating layer portion 124, the temperature of the sample cell at high temperature can be obtained according to Planck's law of black body radiation, but the temperature of the sample cell at low temperature cannot be obtained. In one embodiment, the insulating layer 12 is made of $SiN_X$, and the $SiN_X$ window starts to emit light when the temperature is greater than 600 degrees Celsius.

During step S5', the energization power of the graphene film 16 is increased, the temperature of the window increases as a whole, the red light-emitting region becomes larger, the light intensity becomes larger, and different temperatures will be obtained under different powers.

During step S6', the method for measuring the resistance of the resistance thermometer is not limited. In one embodiment, the resistance of the resistance thermometer is measured by the four-probe method.

Figure 18:
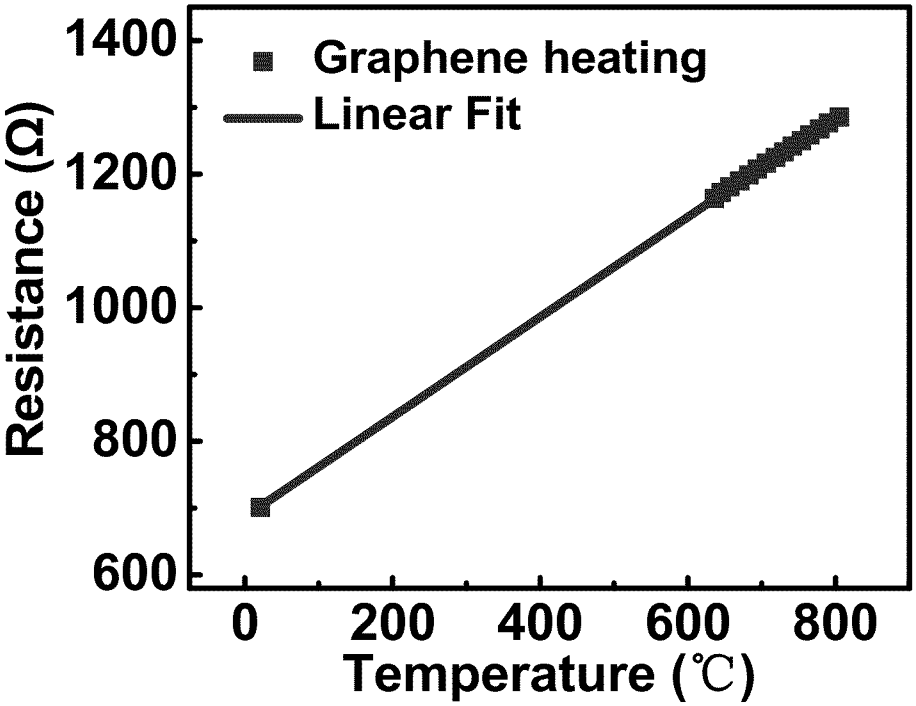
FIG. 18 shows a resistance-temperature straight line obtained by linear fitting in the third embodiment of the present application.

During step S7', the corresponding relationship between resistance and temperature is obtained by linear fitting, as shown in FIG. 18. Since the resistance (resistance of the resistance thermometer) and the temperature (the temperature of the window) have a linear relationship, the temperature of the window can be obtained by measuring the resistance of the resistance thermometer. The temperature includes the high temperature that can make the window emit the visible light and the lower temperatures that do not make the window emit the visible light. Since the plurality of grooves 126 on the window form the sample cell, the temperature of the sample cell is the temperature of the window. That is, by measuring the resistance of the resistance thermometer, the temperature of the sample cell can be obtained, which includes the high temperature that allows the window to emit the visible light, and the lower temperature that cannot allow the window to emit the visible light.

In one embodiment, multiple temperatures of the red light-emitting region are obtained at multiple powers; and at the multiple temperatures, the multiple resistances of the resistance thermometer are measured, respectively. The temperature of the red light-emitting region and the resistance of the resistance thermometer at this temperature are shown in Table 1.

TABLE 1 temperatures of the red light-emitting region and the resistances of the resistance thermometer at corresponding temperatures

| Temperature (° C.) | Resistance (Ω) |
|---|---|
| 21 | 700.9273 |
| 635.9244 | 1163.254 |
| 645.3082 | 1172.504 |
| 656.8273 | 1180.717 |
| 670.3592 | 1189.69 |
| 682.8303 | 1198.67 |
| 694.1085 | 1207.477 |
| 706.3049 | 1216.325 |
| 718.6661 | 1224.765 |

TABLE 1-continued temperatures of the red light-emitting region and the resistances of the resistance thermometer at corresponding temperatures

| Temperature (° C.) | Resistance (Ω) |
|---|---|
| 730.0162 | 1233.088 |
| 741.4744 | 1241.791 |
| 753.9661 | 1249.924 |
| 765.2606 | 1258.549 |
| 778.4663 | 1267.602 |
| 790.6204 | 1276.564 |
| 805.1652 | 1285.443 |

According to the temperatures of the red light-emitting region and the resistances of the resistance thermometer at corresponding temperatures, a linear relationship with a slope of 0.748 and an intercept of 686.91 between the resistances and the temperatures is obtained by fitting.

The method for calibrating the temperature of the graphene heating chip 100 has the following advantages: first, after a straight line is fitted linearly, when the graphene heating chip 100 is heated, even if the window does not emit light, the temperature of the suspended window can be obtained by measuring the resistances of the first electrode 141 (platinum), the second electrode 142 (platinum), the fifth electrode 145 (platinum), and the sixth electrode 146 (platinum); and it is no longer necessary to use a spectral thermometer for temperature measurement; second, it can be compatible with the TEM sample stage, thereby measuring the temperature of the graphene heating chip 100 in real time.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A graphene heating chip, comprising:

a substrate having a first surface and a second surface opposite to the first surface, wherein the substrate defines a through hole extending from the first surface to the second surface;

an insulating layer suspended over the first surface, wherein a window is defined by a portion of the insulating layer covering the through hole and spaced apart from the first surface, and a plurality of grooves is formed on the window;

a graphene film located on a surface of the insulating layer, the insulating layer being sandwiched between the graphene film and the substrate, the graphene film covering the window, wherein the graphene film comprises a first graphene film portion and a second graphene film portion, and the first graphene film portion and the second graphene film portion are spaced apart from each other; and a plurality of electrodes located on the surface of the insulating layer, wherein the plurality of electrodes are sequentially named as a first electrode, a second electrode, a third electrode, a fourth electrode, a fifth electrode, a sixth electrode, and a seventh electrode; the plurality of electrodes are arranged on the surface of the insulating layer in a following configuration: the third electrode is in direct contact with the first graphene film portion, the fourth electrode is in direct contact with the second graphene film portion, the first electrode is in direct contact with the second electrode, the fifth electrode is in direct contact with the sixth electrode, and the second electrode is in direct contact with the fifth electrode; and the first graphene film portion and the second graphene film portion are in direct contact with the seventh electrode; and wherein the first electrode, the second electrode, the fifth electrode, and the sixth electrode are not in direct contact with the graphene film, and are electrically insulated from the graphene film.

2. The graphene heating chip of claim 1, wherein the plurality of grooves are located between the first graphene film portion and the second graphene film portion.

3. The graphene heating chip of claim 1, wherein portions of the plurality of electrodes are located between the first graphene film portion and the second graphene film portion, and are electrically insulated from the graphene film, the portions of the plurality of electrodes being where the first electrode is in direct contact with the second electrode, the fifth electrode and the sixth electrode are in direct contact with each other, and the second electrode is in direct contact with the fifth electrode.

4. The graphene heating chip of claim 1, wherein a material of the insulating layer is silicon nitride or silicon carbide.

5. The graphene heating chip of claim 1, wherein the graphene film is a monolayer graphene.

6. A graphene heating chip, comprising:

a substrate having a first surface and a second surface opposite to the first surface, wherein the substrate defines a through hole;

an insulating layer suspended over the first surface, wherein a window is defined by a portion of the insulating layer covering the through hole and not attached to the first surface of the substrate, and a plurality of grooves is formed on the window;

a graphene film located on a surface of the insulating layer, the insulating layer being sandwiched between the graphene film and the substrate, the graphene film covering the window, wherein the graphene film is a monolayer of graphene, the graphene film comprises a first graphene film portion and a second graphene film portion, and the first graphene film portion and the second graphene film portion are spaced apart from each other; and a plurality of electrodes located on the surface of the insulating layer, wherein the plurality of electrodes are sequentially named as a first electrode, a second electrode, a third electrode, a fourth electrode, a fifth electrode, a sixth electrode, and a seventh electrode; the plurality of electrodes are arranged on the surface of the insulating layer in a following configuration: the third electrode is in direct contact with the first graphene film portion, the fourth electrode is in direct contact with the second graphene film portion, the first electrode is in direct contact with the second electrode, the fifth electrode is in direct contact with the sixth electrode, and the second electrode is in direct contact with the fifth electrode; and the first graphene film portion and the second graphene film portion are in direct contact with the seventh electrode; and wherein the first electrode, the second electrode, the fifth electrode, and the sixth electrode are not in direct contact with the graphene film and are electrically insulated from the graphene film.

7. The graphene heating chip of claim 6, wherein the plurality of grooves are located between the first graphene film portion and the second graphene film portion.

8. The graphene heating chip of claim 6, wherein a part where the first electrode is in direct contact with the second electrode, a part where the fifth electrode and the sixth electrode are in direct contact with each other, and a part where the second electrode is in direct contact with the fifth electrode are located between the first graphene film portion and the second graphene film portion, and are electrically insulated from the graphene film.

9. The graphene heating chip of claim 6, wherein a material of the insulating layer is silicon nitride or silicon carbide.

10. A method of making a graphene heating chip, the method comprising:

providing a substrate having a first surface and a second surface, the first surface being opposite to the second surface;

placing an insulating layer on the first surface;

forming a plurality of electrodes on a surface of the insulating layer away from the substrate, wherein the plurality of electrodes are sequentially named as a first electrode, a second electrode, a third electrode, a fourth electrode, a fifth electrode, a sixth electrode, and a seventh electrode;

forming a through hole on the substrate, wherein the through hole extends from the first surface to the second surface, thereby forming a window defined by a portion of the insulating layer covering the through hole and not attached to the first surface of the substrate;

placing a graphene film on the surface of the insulating layer away from the substrate, wherein the graphene film covers the window;

removing the graphene film except a portion of the graphene film on the window, thereby exposing the plurality of electrodes;

cutting the portion of the graphene film on the window into a first graphene film portion and a second graphene film portion so that the first graphene film portion and the second graphene film portion are spaced apart from each other; the third electrode is in direct contact with the first graphene film portion, the fourth electrode is in direct contact with the second graphene film portion, and the first electrode is in direct contact with the second electrode, the fifth electrode is in direct contact with the sixth electrode, and the second electrode is in direct contact with the fifth electrode; the first graphene film portion and the second graphene film portion are in direct contact with the seventh electrode, and the first electrode, the second electrode, the fifth electrode, and the sixth electrode are not in direct contact with the graphene film and are electrically insulated from the graphene film; and forming a plurality of grooves on the insulating layer between the first graphene film portion and the second graphene film portion.

11. The method of claim 10, wherein the plurality of grooves are located between the first graphene film portion and the second graphene film portion.

12. The method of claim 10, wherein a part where the first electrode is in direct contact with the second electrode, a part where the fifth electrode and the sixth electrode are in direct contact with each other, and a part where the second electrode is in direct contact with the fifth electrode are located between the first graphene film portion and the second graphene film portion, and are electrically insulated from the graphene film.

13. The method of claim 10, wherein a material of the insulating layer is silicon nitride or silicon carbide.

14. The method of claim 10, wherein the graphene film is a monolayer of graphene.

* * * * *